United States Patent [19]

Rosenkranz et al.

[11] 4,035,463

[45] July 12, 1977

[54] METHOD OF MAKING HOLLOW ARTICLES, ESPECIALLY BOTTLES, OF THERMOPLASTICS

[75] Inventors: Otto Rosenkranz; Karl-Heinrich Seifert, both of Hamburg, Germany

[73] Assignee: Heidenreich & Harbeck, Germany

[21] Appl. No.: 587,005

[22] Filed: May 19, 1975

Related U.S. Application Data

[60] Continuation of Ser. No. 389,122, Aug. 17, 1973, abandoned, which is a continuation of Ser. No. 113,197, Feb. 8, 1971, abandoned, which is a division of Ser. No. 752,302, Aug. 13, 1968, Pat. No. 3,599,280.

[30] Foreign Application Priority Data

Jan. 16, 1968  France ............................ 68.136177

[51] Int. Cl.² ........................................ B29C 17/07
[52] U.S. Cl. ................................ 264/94; 264/296; 264/297; 264/327; 264/335
[58] Field of Search .................... 264/89, 90, 92, 94, 264/96, 97, 98, 99, 294, 296, 320, 322, 327, 335, 334, 297; 65/108, 109, 278–280, 282; 425/242 B, 324 B, 326 B, 387 B, DIG. 203, 208, 213, DIG. 211, 342

[56] References Cited

U.S. PATENT DOCUMENTS

| | | | |
|---|---|---|---|
| 1,643,215 | 9/1927 | Koenig | 65/282 X |
| 1,884,131 | 10/1932 | Neidich | 264/322 |
| 1,948,605 | 2/1934 | Whitehouse | 264/322 X |
| 2,470,923 | 5/1949 | Eisler | 65/279 |
| 2,485,885 | 10/1949 | Hoopes | 264/DIG. 41 |
| 2,601,744 | 7/1952 | Everett | 65/109 |
| 2,792,593 | 5/1957 | Hardgrove, Jr. | 425/384 X |
| 2,900,665 | 8/1959 | Walker | 264/296 X |
| 3,078,517 | 2/1963 | Makowski | 425/129 X |
| 3,079,637 | 3/1963 | Marzillier | 425/DIG. 211 |
| 3,300,559 | 1/1967 | Baehr | 264/322 X |
| 3,324,507 | 6/1967 | Arlo | 425/DIG. 208 |
| 3,415,915 | 12/1968 | Lecluyse et al. | 425/DIG. 211 |
| 3,435,109 | 3/1969 | Flaming | 264/296 |
| 3,509,252 | 4/1970 | Baehr | 264/322 X |

FOREIGN PATENT DOCUMENTS

628,964  11/1961  Italy ................................. 264/94

*Primary Examiner*—Jan H. Silbaugh

[57] ABSTRACT

Hollow articles of thermoplastics, especially bottles, are made from tubular blanks by heating the ends thereof and press molding first their bottom and neck portion. Then the preformed blanks are heated around their center portion and are transferred into blow molds for inflating them to the final shape. The machine consists of a first rotary table with preheating and press molding means, a second rotary table with final heating means and a third rotary table with blow molds. The rotary tables are connected by transfer stations so that the blanks can be automatically transmitted and conveyed around all tables. The high throughput allows installation before racking plants.

7 Claims, 9 Drawing Figures

INVENTORS
Otto Rosenkranz
Karl-Heinrich Seifert
By Beaman & Beaman
attys

METHOD OF MAKING HOLLOW ARTICLES, ESPECIALLY BOTTLES, OF THERMOPLASTICS

This is a continuation of application Ser. No. 389,122, filed Aug. 17, 1973 and now abandoned which is a continuation of application Ser. No. 113,197, filed Feb. 8, 1971 and now abandoned, which is in turn a divisional application of Ser. No. 752,302, filed Aug. 13, 1968, now U.S. Pat. No. 3,599,280.

BACKGROUND OF THE INVENTION

It is known to make hollow articles, especially bottles, by a blowing method, in that a hose extruded directly before by means of an extruder is blown into the desired hollow article using a blow mold. In this operation it is also known to extrude several hoses simultaneously which are blown into bottles with the aid of alternately working blow mold batteries. It is known, too, to finish a hose extruded by means of an extruder on rotary attachment machines working continuously or in a fixed-cycle operation, said hose being fed to said machines.

The production rate of these methods and machines is limited and is far from being equal to the throughput per capacity hour of the usual automatic racking plants. The throughput capacity of such automatic racking plants, for example, amounts to about 10,000 to 50,000 bottles per hour.

The invention is concerned with the problem of providing a method for the production of hollow articles, especially bottles, of thermoplastics, which allows for the construction of machines with an especially high production rate, so that also the throughput of the blowing machine constructed in accordance with the invention will approximately correspond with the throughput per hour of a racking plant. In addition, the invention is concerned with the problem of reducing the expenses in the manufacture of such bottles and to provide the conditions for small and quickly operating blowing machines which, in spite of high speeds, will be able to work essentially without vibrations.

It has already been proposed to supply tubular blanks open on both ends and made of thermoplastics to a bottle blowing machine and to heat these blanks in the blowing machine to forming temperature (welding temperature) and to inflate them to the desired shape. In order to solve the problem, the invention starts out from this known method.

SUMMARY OF THE INVENTION

In accordance with the invention, the cold tubular blank is seized at its center portion so that the two ends are freely exposed. Thereupon, the ends of the blank are heated to forming temperature (welding temperature) and are shaped while keeping one end open, whereupon the intermediate-shaped blank is seized from inside; heated to the forming temperature on its entire length; charged into a premold enclosing it and inflated therein to the desired hollow shape, especially that of a bottle.

In this manner, the blank may be carried at its center portion from outside when forming the bottom and the neck portion of the hollow article, in particular, the bottle, which facilitates the especially difficult formation of the bottom and neck portion. A welding operation is necessary especially for the formation of the bottom. In accordance with the invention, only the ends of the tubular blank need be heated to welding temperature (in the case of polyvinylchloride to about 160°); this leads to an essential shortening of the preheating time and, in addition, to a reduction of the amount of heat necessary for the shaping of the tubular blank. The intermediate-shaped blank, the ends of which thus have already been shaped only need be heated to a deformation temperature which is below the welding temperature and, in the case of hard polyvinylchloride, lies at about 110° C.

Preferably, for the formation of the bottom and/or neck portion of the hollow article, the end of the blank heated to forming temperature which is provided for the formation of the neck portion, is moved or pressed essentially in an axial direction into a closed hollow mold corresponding to the desired shape, which, in a kinematic inversion, may also be carried out in such a manner that the hose blank is retained and the mold elements are moved axially towards the hose end. In this manner, the hollow article is provided with a vaulted bottom which contributes to a more economic exploitation of the material. In particular, the well-known over-stretched portions of the bottom are avoided in the mesh welding step of the hose flattened by the mashing, which is especially favourable for bottles provided to withstand internal pressure. In addition, with such a deformation of the ends, squeezed-off waste portions will occur neither at the bottom nor the neck.

Preferably, the end of the tubular blank provided for the formation of the bottom or the neck portion is heated at the outer edge to a maximum temperature corresponding essentially to the welding temperature of the thermoplastic material with gradual transition to a temperature below the thermoplastics softening temperature directly at the inner end of the blank end region provided for the formation of the bottom or neck. Therefore, only those blank regisions are heated to welding temperature which are welded and/or subjected to an especially intensive and strong deformation.

The invention is furthermore improved by the fact that the tubular blank and the intermediate-shaped blank formed therefrom, respectively, are moved continuously from a feeding station past a pre-heating and past a final heating station to an ejector station, during the pre-shaping or finishing steps, respectively. In this manner, the influence of the inertia forces is reduced to a minimum. It is made possible hereby to provide the machines with a large number of working units which is the prerequisite for a machine of high production rate.

A machine to carry out the process of the invention is characterized by at least one continuously movable rotary table on the periphery of which, thereare arranged devices for retaining and shaping the tubular blanks and intermediate-shaped blanks in such a manner that the axes of the blanks and the intermediate-shaped blanks are disposed in parallel with the axis of rotation of the rotary table, said rotary table being supported for rotation with respect to stationarily arranged preheating and final heating devices.

In order to obtain an improved efficiency, the heating apparatuses may also be moved along with the rotary table. They must then be moved away from the region of the blank axis before the forming step begins. The heating apparatuses may be radiators, hot air or high-frequency heating means. When heating the ends of the tubular blank the heating means are preferably effective on the inside and outside of the wall of the blank ends. Preferably this rotary table or these rotary tables, respectively, are charged from radial direction whereby it is made possible to provide the rotary table(s) with a number of working units without impairing the accessibility of these individual units.

It will be recommendable in general to start from cold tubular blanks having a circular cross-sectional area. But it is possible to use blanks with any other crosssectional area.

With a preferred embodiment of the invention, there are provided several, in particular three, rotary tables driven in synchronism at a fixed speed ratio, the first rotary table comprising a plurality of devices for gripping the tubular blanks from outside, and the same number of axially movable auxiliary means for shaping these blanks; in this arrangement, a sector of this first rotary table is associated with the operating range of the pre-heating means. To the periphery of the second rotary table there may be supplied the intermediate-shaped blanks, said periphery of said second rotary table having associated thereto means for heating preferably the center portions of the intermediate-shaped blanks (finish heating means). The third rotary table has arranged thereon a plurality of multiple, in particular bipartite blow molds, a corresponding number of blowing means and ejectors for removing the finish-blown hollow articles.

In accordance with the invention, in addition, the inner mold half of a closed bottom mold is arranged on a blowing mandrel for the formation of the vaulted bottom of the intermediate-shaped blank; in addition, the blowing mandrel serves as a device for seizing the interior of the blanks and inter-mediate-shaped blanks for transporting the intermediate-shaped articles from the pre-shaping station via the final-heating station to the blowing station.

BRIEF DESCRIPTION OF THE DRAWINGS

Further improvements and suitable further developments of the invention will be explained by way of the enclosed drawing, in which an embodiment of the machine designed in accordance with the invention is shown. In the drawing.

DESCRIPTION OF THE PREFERRED EMBODIMENT

Figure 1:
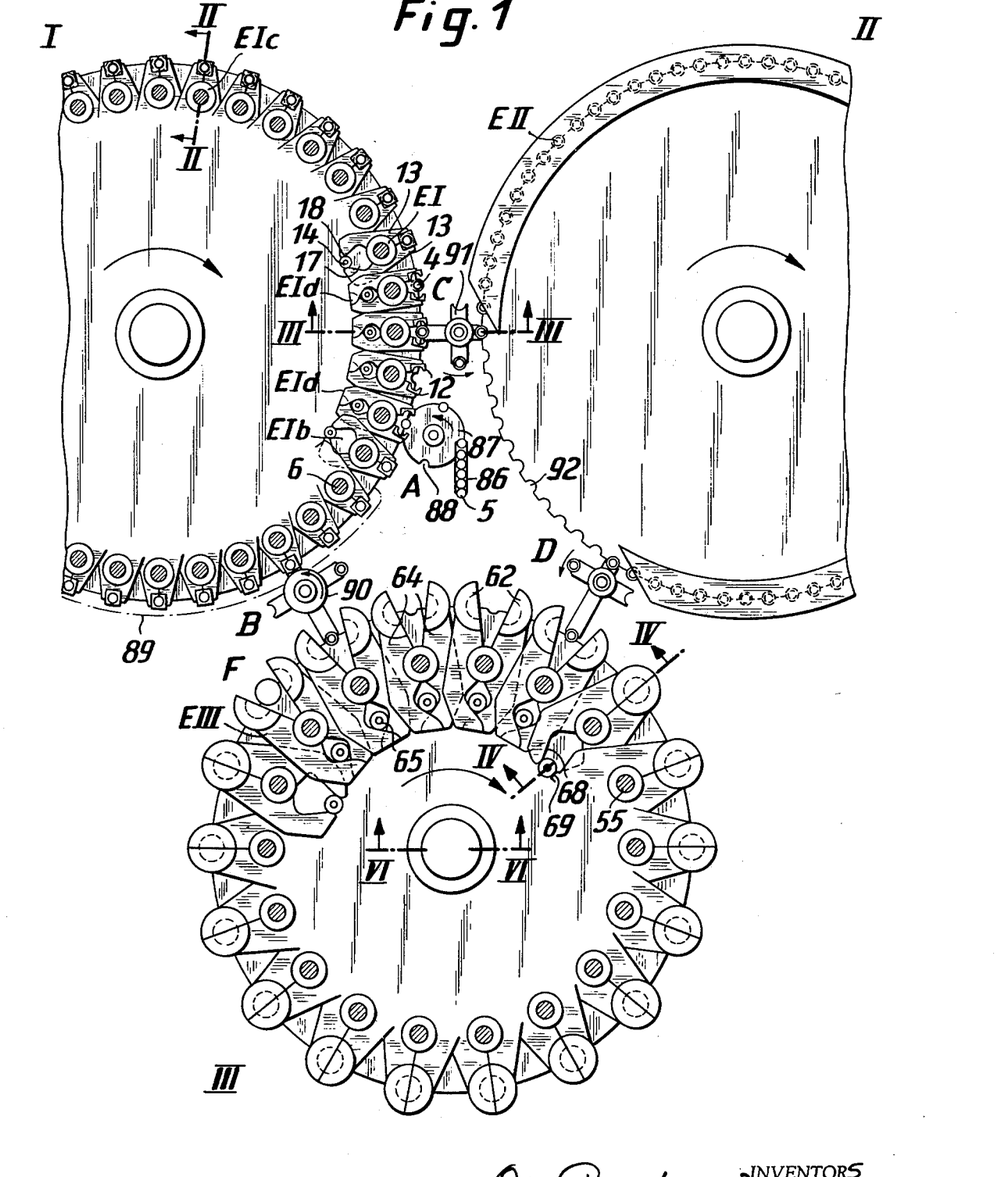
FIG. 1 shows a schematic top plan view on a machine designed in accordance with the invention, eliminating all the parts not absolutely necessary for the operational principle of the invention.

In accordance with FIG. 1, the embodiment shown in the drawings comprises three rotary tables I, II and III which are synchronously driven at a fixed speed ratio with respect to each other with the aid of gearings in a manner not shown in more detail. Also the driving machine proper is not shown in the drawings, for the sake of simplicity.

The rotary table I, in the following, will also be called a pre-shaping table; the rotary table II a final-heating table; and the rotary table III, a blowing table.

Figure 2:
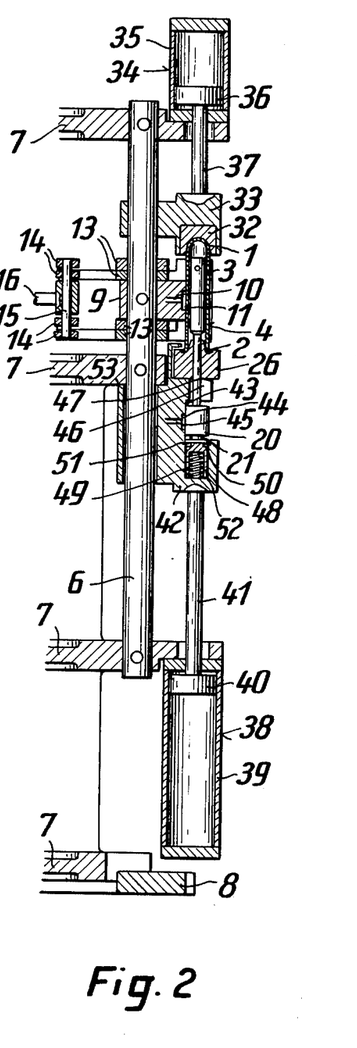
FIG. 2 shows a partial sectional view according to line II—II of FIG. 1 on an enlarged scale representing the formation of the vaulted bottom and the neck ring reinforcement at a tubular blank.
Figure 3:
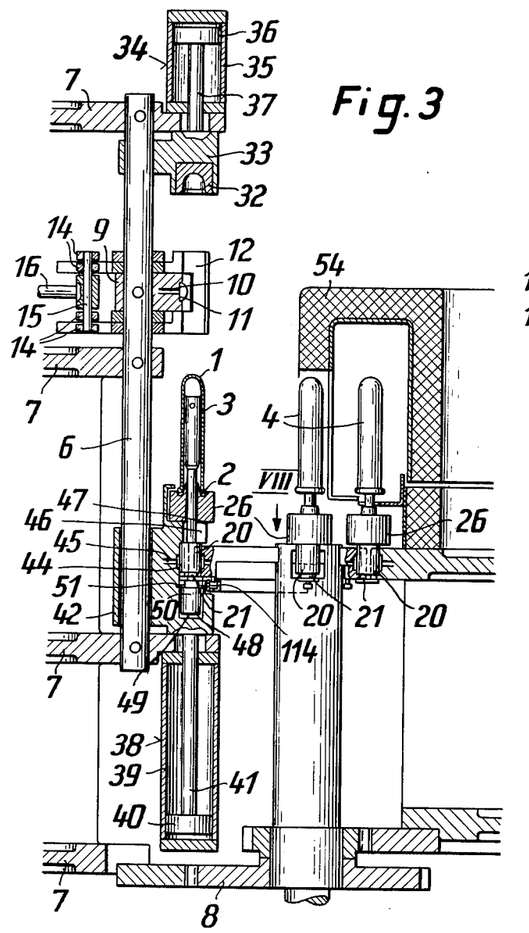
FIG. 3 shows a partial sectional view taken on line III—III of FIG. 1 on an enlarged scale to illustrate the transfer of a blowing mandrel carrying an intermediate-shaped blank, from the first rotary table to the second rotary table.

The pre-shaping table I comprises a plurality of units EI on its periphery, the details of which are shown more exactly in FIG. 2 and in the left hand portion of FIG. 3.

Figure 4:
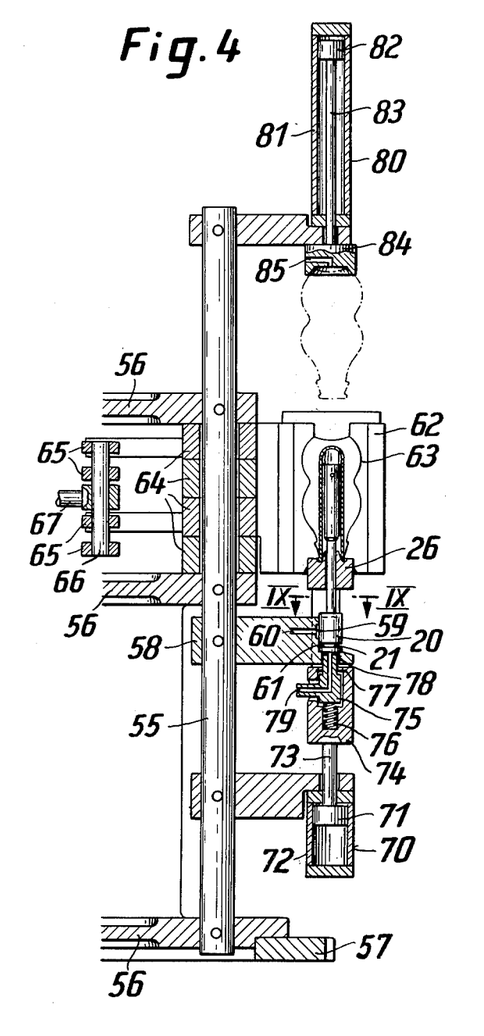
FIG. 4 shows a partial sectional view taken on line IV—IV of FIG. 1 on an enlarged scale for illustrating the bipartite blow mold arranged on the third rotary table, the pertaining blowing air supply head, andthe ejector.

In a corresponding manner, the final-heating table II comprises a plurality of units EII on its periphery which are shown in detail to the right in FIG. 3 and, finally, there are a plurality of units EIII arranged on the periphery of the blowing table III which are represented in detail on an enlarged scale in FIG. 4.

In three tables I, II and III are adapted to be driven continuously. On the blowing table III, there are arranged for example 18 units EIII, while on the pre-shaping table I there are arranged 36 units EI, and on the final-heating table II there are arranged 72 units EII.

Correspondingly, the pre-shaping table I is driven at half the speed, and the final heating table II at one quarter of the speed of the blowing table III.

FIG. 2 shows the unit EI in that position in which the vaulted bottom cap 1 and the neck ring reinforcement 2 of the blank have just been formed. The central portion 3 has remained cold in this operation; this product formed of the vaulted bottom 1, the central portion 3, and the neck ring reinforcement 2, is called herebelow an intermediate-shaped blank.

This intermediate-shaped blank 4 is formed of cold tubular blanks 5 in a manner described in more detail below, which are supplied to the pre-shaping table I at the feeding station A. The rotary table I has arranged on the periphery thereof a plurality of spindles 6 which serve to support all the parts of the units EI. The support of the rotary table is designated 7 and is only shown in part. The gear provided for the drive thereof is marked the reference numeral 8.

On the spindle 6 there is fastened a transfer holder 9 which serves to releasably hold a tubular blank 5 or an intermediate-shaped blank 4, respectively. It encompasses the tubular blank 5 or the intermediate-shaped blank 4, respectively, from outside around approximately the half periphery only, so that the intermediate-shaped blank 4 or the pre-shaped blank 5 may be moved out of the transfer holder 9 by a radial movement (radial with respect to the axis of rotation of the rotary table I). The intermediate-shaped blank 4 of the pre-shaped blank 5 are kept in the transfer holder 9 with the aid of vacuum which is supplied via a channel 10 and is acting on the blank via a recess 11 which is provided on the inside of the transfer holder 9. As soon as the intermediate-shaped blank 4 is to be retransmitted to a transfer device in the manner described in more detail herebelow, the recess 11 may be fed also with compressed air via the channel 10.

Holding jaws 12 provided on levers 13 supported for rotation about the spindles 6 are additionally serving to retain the tubular blank 5 and the intermediate-shaped blank 4 on the periphery of the rotary table I. Every two of these levers are formed symmetrically to each other and are each arranged one on each side (looking in the axial direction of the spindle 6) of the transfer holder 9. The jaws 12 with their levers 13 are controlled by rollers 14 which are supported for rotation on a common journal 15 and are movable by means of a rod 16 in a radial direction in a manner not shown in more detail, that means in a plane which extends through the axis of rotation of the table I and the axis of the spindle 6.

The roller proper cooperates with camming surfaces of the levers 13 which comprise an opening branch 17 and a closing branch 18. In the region of the opening branch 17, the levers 13 act against the roller 14 under a wide angle so that long opening paths are resulting from a short stroke of the roller. In the region of the closing branch 18, the levers 13 act against the rollers in the clamping position with a very flat angle so that great closing forces are obtained.

Figure 5:
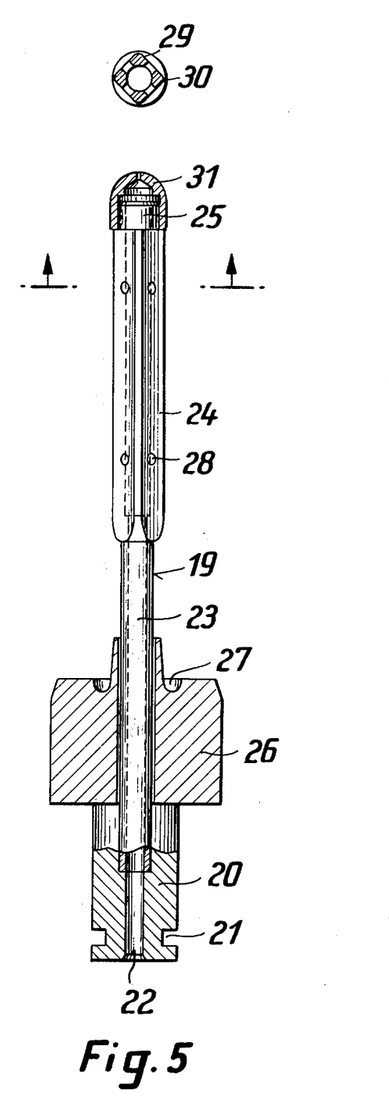
FIG. 5 shows a side elevational view, partially in section, of a blowing mandrel designed in accordance with the invention.

FIG. 5 shows more exactly a blowing mandrel. As will be seen from the following specification, the individual blowing mandrels are transferred from the pre-shaping table I after each of these blowing mandrels has been taken charge of an intermediate-shaped blank, to the final-heating table II. After here the intermediate-shaped blank 4 and particularly the center portion 3 thereof which has so far remained cold, have been heated to forming temperature, the intermediate-shaped blanks carried by the blowing mandrels are delivered to the blowing table III. Here, the finally desired hollow article, in particular, the bottle, is blown from the intermediate-shaped blank. The mandrel is removed somehow from the intermediate-shaped blank, which has become the finally shaped bottle, whereupon the blowing mandrel is again returned to the pre-shaping table I. The individual blowing mandrels, thus during the working operation move along a closed path from the rotary table I via the rotary tables II and III back to the rotary table I.

The blowing mandrel 19 is provided with a cylindrical mandrel holder 20 in accordance with FIG. 5, which comprises a circumferentially extending groove 21 for the application of axial forces and for the performance of the mandrel transport. On the underside of the mandrel holder 20, there is provided a central bore 22 for the supply of the blowing air. The mandrel shaft is divided into three portions 23, 24, 25. The lower portion 23 serves to guide a neck ring mold 26 which, in the example of embodiment, is designed with an annular groove 27 for the formation of the neck ring reinforcement of the desired bottle. The center portion 24 is provided with exit bores 28 and serves to loosely guide the blank 5 or the intermediate-shaped blank 4, respectively. For this purpose, the center portion 24, for example, has a square cross section with the exit bores 28 extending from the surfaces 29 thereof, while the corner edges 30 guide the blank 5 or the intermediate-shaped blank 4, respectively.

A round mandrel top 31 is fastened to the upper end of the blowing mandrel 19. It constitutes the inside mold portion of the bottom mold of the desired hollow article, especially the bottle. The one end of the tubular blank 5 is transformed into a vaulted bottom by this mold portion in connection with an outer mold portion of the bottom mold still to be described later on, and welded. In order to restrict here metallic heat conduction, the round mandrel top is of low mass, or, the possible contact is reduced, respectively, by the design of the center portion 24.

The outer bottom mold portion is designated by the reference numeral 32 (FIG. 2 and 3). It is replaceably arranged in a mold half carrier 33, which is arranged on the spindle 6 for axial displacement by means of a double-acting servo motor 34. The servo motor 34 is supported on the rotary table I and, in the shown embodiment is formed as a cylinder 35, the double-acting piston 36 of which is in engagement via a piston rod 37 with the outer mold half carrier 33.

Another servo motor 38 is arranged in the same axis of the servo motor 34 but on the underside of the rotary table I, said servo motor 38 being likewise designed as a cylinder 39 with double-acting piston 40. This piston 40 engages at a blowing mandrel carriage 42 via a piston rod 41, said blowing mandrel carriage 42 being arranged on the spindle 6 for axial displacement.

The carriage 42 comprises a radially outwardly opening center recess 43; the inner surface of this recess is provided with a smaller recess 44 extending approximately through a semi-circle, said recess 44 being adapted to be connected selectively to a source of compressed air or a vacuum source via channels 45. The upper leg 46 of the blowing mandrel carriage is provided with a radially outwardly opening groove into which the lower blowing mandrel shaft 23 may be moved. The neck ring mold 26 is disposed above said leg 46 in the region of the rotary table I. In order to make possible the run-in movement of the neck ring mold in this position, the upper surfaces of the leg 46 are tapered as shown at 47. In the transverse direction the blowing mandrel is retained by the recess 44 by action of vacuum, so that in this manner the mandrel holder 20 is pulled against the corresponding surface of the mandrel carrier 42.

In the lower part of the mandrel carrier, a bushing 48 is supported for axial displacement. A spring 49 forces a shoulder 50 of this bushing against a stop 51 of the bore 52 of the bushing, said stop being formed as a circlip. The mandrel holder 20 is supported on the head of this bushing. As will be seen from FIG. 2, in the position shown there, the blowing mandrel carriage 42 is urged against a stop 53 by means of the piston 40 of the cylinder 39, said stop being formed by the rotary table I itself.

The left-hand portion of FIG. 3 still shows the units EI of the pre-shaping table I, while the right-hand portion of this figure shows the units EII of the rotary table II. By far the greatest portion of the periphery of this rotary table is occupied by a heating device 54 which surrounds a great portion of the intermediate-shaped blank 4.

The units EIII of the blowing table III are supported on spindles 55 similar to the spindles 6 of the table I (FIG. 4). The individual parts of the rotary table III are referenced 56 while the gear provided for the drive thereof is referenced 57. The individual units EIII of the blowing table III comprise a transfer holder 58 which is fastened on the spindle 55. The transfer holder comprises an outwardly open recess 59 which may be communicated with a vacuum source or a source of compressed air via channels 60. In the drawing of FIG. 4, the mandrel holder 20 of the blowing mandrel lies close against a corresponding recess of semi-circular cross sectional area of the transfer holder 58 and is held by a vacuum acting in the recess 59. In the axial direction, the mandrel holder 30 is held in the transfer holder in that the annular groove 21 thereof engages within a corresponding projection 61 of the transfer holder 58. The blowing mandrel is introduced into the transfer holder 58 from outside. On the spindle 55, there are also supported two blow mold halves 62 rotatable with respect to each other which serve to carry blow mold inserts 63. The mold halves 62 and the blow mold inserts 63 are separated by a plane which extends through the axis of the spindles 55 and the axis of rotation of the table III. Two levers 64 are engaging at each blow mold half 62 and are supported on the spindle 55. The blow mold halves 62 and their levers 64 are formed symmetrically to each other. They are controlled by means of rollers 65 which are rotatably supported on a journal 66 which is movable by means of a rod 67 in a radial direction. On the levers 64 of the blow mold halves 62 cam surfaces are provided which cooperate with the rollers 65. Each cam surface comprises an opening path 68 and a closing path 69. The levers 64 are acting against the rollers 65 along the opening path 68 under a great angle in order to obtain long opening paths with a short roller stroke. Along the closing path 69 the levers 64 are acting against the rollers 65 with a very flat angle in order to obtain a great closure force in the clamping position.

A servo motor 70 is in addition fastened on the spindle 55 of the blowing table III which, in the shown embodiment, consists of a double-acting piston 71 in a cylinder 72. The piston 71 is fastened at a blowing air supply head 74 by means of piston rod 73. A blowing air supply nozzle 75 is arranged therein for axial displacement. A spring 76 tends to press the nozzle against a stop 77 provided on the blowing air supply head 74 and formed by a circlip. The blowing air supply head 74 with the nozzle 75 may be pressed against the mandrel holder 20 from below with the interposition of a sealing disc 78; in the position shown in FIG. 4 the nozzle 75 has slightly moved backwards against the action of the spring 75, so that now blowing air may enter into the blowing nozzle through the channel 79 thereof (the blowing air supply not being shown here in more detail).

Finally, another servo motor 80 is arranged on the blowing table III which is likewise constructed as a cylinder 81 with a piston 82 adapted to be under action of a pressurized medium from both sides. The piston is connected with an ejector head 84 by means of its piston rod 83, said ejector head 84 being adapted to be connected to a vacuum source and/or a source of compressed air via a channel 85.

In the following, the mode of operation of the machine will be described with reference to FIG. 1. Tubular pieces true to size as blanks 5 are supplied to the station A via a channel 86, from a bunker (not shown) through a conveying and sorting device (likewise not shown) of some known construction. The "four-toothed" wheel 87 turning counterclockwise in the shown embodiment, takes over one tubular portion or blank 5 in each one of its semi-circular recesses 88. After rotation of the feeding wheel 87 through 180°, the tubular blank 5 faces a transfer holder 9 of the pre-shaping table I which turns clockwise at the same peripheral speed. At this point, the recess 88 of the supply wheel 87 which faces the rotary table I is switched to "open" or "pressurized air in" while the recess 11 of the transfer holder 9 is connected to the source of vacuum via the channel 10. With this, the tranfer of a tubular blank 5 to a unit EI of the pre-shaping table I is effected. Guiding devices (not shown) take care of the proper position in vertical sense of the tubular blank 5. This type of transfer and take-over applies equally to all the other stations. With the transfer of the blowing mandrels, the transfer and take-over might also be carried out by magnetic forces, especially with the aid of electro-magnets.

Directly following the transfer of a tubular blank 5 to the unit EIa (see FIG. 1), the blank 5 is clamped in the unit EIb by means of the clamping jaws 12, the levers 13 and the pressure rollers 14.

About half the periphery of the rotary table I is surrounded by a heating device 89, which is designed especially as a radiator, hot air heater or high-frequency heater and which is effective on the inner wall as well as on the outer wall of the tubular blank 5. Here, only the ends thereof disposed outside the clamping jaw 16 are heated, or the heating elements taken along are acting at these regions.

The pistons 40 and 36 of the two servo motors 38 and 40 are disposed in the retracted position (FIG. 2). In the region of the units EIa and EIb, there are not yet any blowing mandrels available.

In the station B, the retransmission or transfer of the blowing mandrels 19 which have become vacent on the blowing table III, to the pre-shaping table I takes place. A transfer wheel 90 serves to this purpose. It is possible and practical to arrange on the pre-shaping table I double the number of units EI so that table I must perform half the number of revolutions per hour as compared to the blowing table III. The different peripheral speed is taken into consideration at the restransmission station B by the wheel 90 with non-uniform drive. The principle of the non-uniform drive is applied also in connection with the stations C and D which will be described in more detail in the following. As will be seen from the left-hand portion of FIG. 3, the blowing mandrel carriage 42 when in station C to be described in the following, already is in its retracted position. In this retracted position, the blowing mandrel carriage 42 with its surface 43 will be able to take over the mandrel holder 26 which is about in the same vertical position like the blowing carriage (see FIG. 4). After the transfer of one blowing mandrel from the blowing table III to the pre-shaping table I at the station B has taken place, the heating of the two ends of the blank 5 from inside and outside by means of the heating device 89 is continued until both ends have been heated approximately to the welding temperature in the manner described above. In a suitable place between the stations B and C, with the embodiment at the unit EIc according to FIG. 1, the integral formation of the bottom 1 and the neck ring reinforcement 2 takes place with the machine running, in order to form the intermediate-shaped blank 4. For this purpose, the mandrel holder 20 with the blowing mandrel 19 is pressed into the upper slop position by means of the blowing mandrel carriage 42, in which the mandrel carriage 42 lies close to the stop 53 of the rotary table I. The neck ring reinforcement 2 is hereby formed like an open die in that the lower end of the tubular blank 3 which is sufficiently heated, is pressed into the groove 27 of the neck ring mold 26, with the cold and solid blank center portion being rigidly retained by the jaws 12 with the levers 13. Immediately thereafter the integral shaping of the vaulted bottom 1 takes place in the manner of a local injection molding process. In the interspace formed by the round mandrel top 31 and the bottom mold 32, the vaulted bottom is integrally formed and welded. The temperature gradient is selected in a way that the outer marginal zone of the tube which is most strongly deformed, is at welding temperature, and the temperature gradually passes over to the lowest temperature near the original cylindrical part 3. Here, the tubular blank 5, which has now been formed into the intermediate-shaped blank 4, is at a temperature below the softening point.

In order to avoid the formation of folds by unsupported deformation of the bottom part 1, the blowing mandrel 19 had been at a higher position corresponding to the play present between the stop 51 and the shoulder 50 in FIG. 2. When lowering the bottom mold 32, the compression spring 49 will recede with the pressure of the bottom mold increasing, until it has reached its stop position as shown. After a sufficient solidification of the hollow article or intermediate shaped blank in this manner, it is transferred together with its blowing mandrel in the transfer station C to the final-heating table II which consists essentially of a heating device 54 along which the intermediate-shaped blanks 4 retained by the blowing mandrels are moved onward. The clamping of the intermediate-shaped blank 4 by means of the jaws 12 was released shortly before reaching the transfer station C, namely at the unit EId, the piston 36 with the bottom mold 32 and the piston 40 with the blowing mandrel carriage 42 having likewise been moved back into their retracted positions. For this purpose, the communication of the channels 10, 11 provided in the transfer holder 9 with the vacuum source has also been interrupted so that the intermediate-shaped blank 4 is moved back from its position shown in FIG. 2 into its position shown in FIG. 3. In the position of engagement of the transfer station C, a spider 91 with non-uniform peripheral speed takes over the blowing mandrel 19 carrying the blank 4, and transfers it to one of the reception recesses 92 of the final-heating table II after a rotation through 180°. When the blowing mandrel is moved out of the region of the blowing mandrel carriage 42, the neck ring mold 26 will fall back onto the mandrel holder 20, so that in this manner the lower opening of the intermediate-shaped blank 4 will be released which will lead to an improvement of its heating.

The residence time of the blanks in the heating device 54 of the final-heating table II will be the longer, the more intermediate-shaped blanks are accommodated. Therefore, the table periphery must be fully exploited so that there will be four times as many units EII arranged on the rotary table II as are units EIII arranged on the blowing table III. The speed of the blowing table III accordingly is four times that of the final-heating table II.

The blank 5 is uniformly brought to the deformation temperature by the heating device 54, in the case of hard polyvinylchloride, for example, to approximately 110° C.

Figure 9:
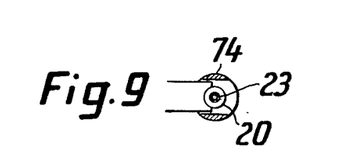

In the station D (see FIG. 1) the blowing mandrel 19 with the heating intermediate-shaped blank is passed on to the blowing station formed by the blowing table III. Immediately after the transfer of the blowing mandrel and the intermediate-shaped blank to the blowing table III, the associated bipartite blow mold is closed (see FIG. 4) with the neck ring mold 26, however, still being disposed in its lower position shown in the right-hand portion of FIG. 3. Immediately upon closing the blow mold 62, 63, the neck ring mold 26 of the blowing mandrel is pressed into the stop position of the blowing mold shown in FIG. 4 by means of a lifting device surrounding the mandrel holder 30 like a fork (see FIG. 9). With this, the intermediate-shaped blank 4 is sealed in the neck portion against the blowing air. With the upward movement of the lifting device described, also the blowing air supply head 74 with the blowing air supply nozzle 75 is connected to the bore 22 of the lower end face of the blowing mandrel 19 shortly before the stop position by means of the piston of the servo motor 70. During the remainder of the path to be travelled by the lifting device serving to lift the neck ring mold, the nozzle 75 recedes within the blowing air supply head while tensioning the spring 76. This blowing mandrel is now biased with compressed air. After inflation and a sufficient solidification by cooling, the associated conduit will be communicated with the air exit channel. The blowing mold 62, 63 is now opened and the ejector or the lift-out device 84 pulls the finished bottle off the blowing madrel as is indicated in dash-dotted lines in FIG. 4. This corresponds to the position F in FIG. 1.

The finished bottle is either passed on to a bunker or directly to the filling train which leads to an automatic racking machine.

With the mold system described, which allows for a very compact construction, the mold carriers 62 are designed as cylindrical half-shells and accommodate cylindrical mold halves 63. This may be well combined with a suitable cooling arrangement for the molds. The mold carriers are provided with compulsory paths for the guidance of the coolant machined in their inner cylinders. Because these compulsory paths are opening outwardly, they are easy to manufacture. The shape of the body of the bottle may be simply changed by replacement of the mold halves 63 in the mold carriers 62.

Figure 6:
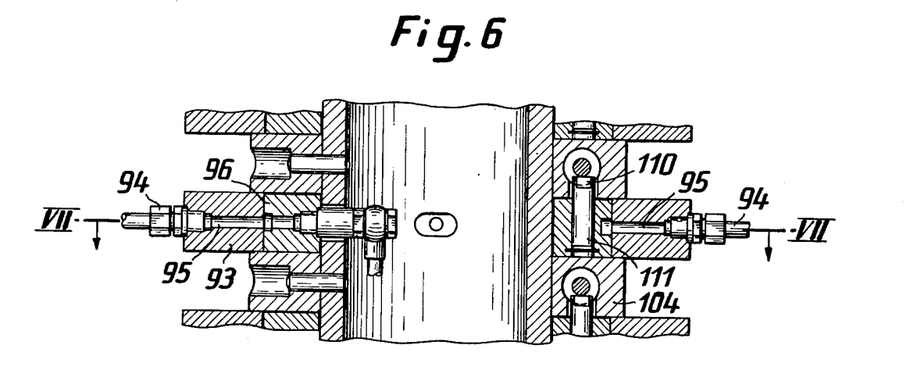
FIG. 6 shows a partial sectional view taken on line VI—VI of FIG. 1 on an enlarged scale to illustrate the manner of the supply and discharge of the blowing air.
Figure 7:
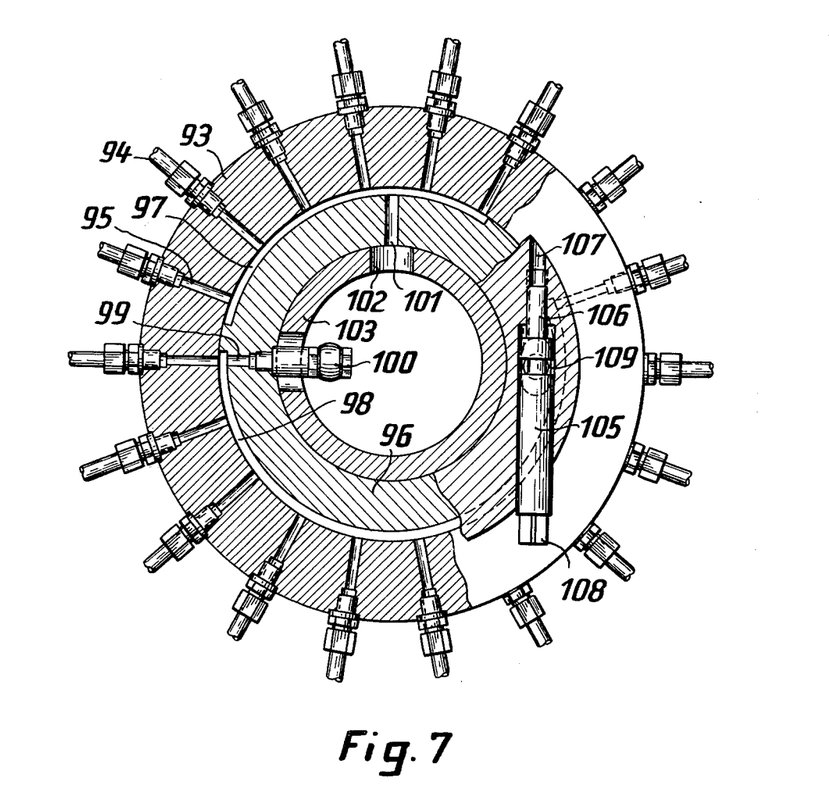
FIG. 7 shows a partial sectional view taken on line VII—VII of FIG. 6.

FIGS. 6 and 7 show one of several similar rotary slides which are used for the controlled tranfer of compressed air, vaccum and used air as well as pressurized and cooling liquid to the three rotary tables. Similar rotary slides constructed correspondingly smaller are arranged in the transfer stations A, B, C and D.

The outer ring 93 forms part of the rotary table, in the example of embodiment of the blowing table III. The conduits 94 with the bores 95 lead to the individual blowing mandrels 19, that means they are connected to the channel 79 of the blowing nozzle 75 of FIG. 4. The ring 96 is arranged stationarily during operation and is provided with a used air sector 97 and a blowing air sector 98 which extend through a certain region of the ringe 96. The blowing air sector 98 is connected to a source of compressed air via a bore 99 and a conduit 100. The used air sector 97 communicates with the outside atmosphere or a line leading to the outside atmosphere, respectively, through a bore 101 in the ring which is arranged stationarily during operation and a bore 102 in the ring 103. The control ring 96 is arrnaged stationarily during operation but may be adjusted or rotated, respectively, in limits to obtain the proper adjustment. For this purpose, an adjusting spindle 105 is arranged in a ring 104 which is fixedly connected with the table stand III, said adjusting spindle extending approximately tangentially with respect to the rotary table. The adjusting spindle 105 engages in a threaded bore 107 of the stationary ring 104 by a threaded bolt end 106 and, on the outwardly projecting end, is provided with an end 108 to fit a wrench. In addition, the adjusting spindle is provided with an annular groove 109 with the flat end 110 of a bolt 111 engaging therein, the axis of said bolt extending in parallel with the axis of rotation of the table, said bolt being supported in the control ring 96. It is possible by adjustment of the adjusting spindle 105 to rotate the control ring 96 within certain limits and therewith also to adjust the switching positions. This adjustment, if desired or required, is also possible during operation. For a mere adjustment it would suffice to adjust the outer ring of the rotary slide. FIGS. 6 and 7 show only as an example the control of the blowing air. The remaining controls may be provided in the same manner. In case a table needs several controls, the corresponding rings will be arranged one above the other.

As an alternative, an axial sealing may also be selected for the above device explained with radial sealing of the rotary slides.

The slides 112 of the transfer devices (see FIG. 8) are arranged crosswise and are provided with rollers 113 or journals at their ends engaging in a stationary, preferably circular groove 114, which is arranged eccentrically with respect to the axis of rotation of a slide carrier having the slides 112 displaceably supported therein one above the other, said slide carrier rotating uniformly about this axis. The circular groove 114 is designed in such a manner that only one roller 113 of a slide is guided at a time. At the inlet 115 and outlet 116, the chordal length of the groove is equal to the distance of the roller axes of a slide.

Figure 8:
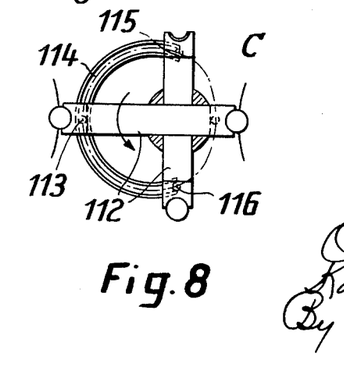
FIG. 8 shows a top plan view on a transfer device in the direction of the arrow VIII of FIG. 3, FIG. 9 a partial sectional view taken on line IX—IX of FIG. 4 of the fork-shaped lifting device.

The groove changes constantly the radius of action of the slide. With this, the different peripheral speeds of the rotary tables may be balanced.

What we claim is:

1. In a method of making a blow container, the steps of exteriorly gripping a tubular thermoplastic blank intermediate its two ends with holding jaws which are mounted on the periphery of a first rotary wheel, rotating the wheel and thereby conveying the gripped blank with exposed ends along a circumferential path including heating means, during the rotation of the first wheel (a) inserting a mandrel into the blank, (b) heating only the ends of the blank to a forming temperature and then (c) deforming one heated end of the blank to form a neck for the container and forming the other heated end into a closed end portion, thereafter transferring the mandrel and the thus formed blank from the first rotary wheel to a second rotary wheel, rotating the second wheel to convey the mandrel and blank along a heated circumferential path to bring the entire blank to a blowable temperature, transferring the blowable blank and mandrel from the second rotary wheel to a third rotary wheel, enclosing the blowable blank in a sectional blow mold mounted on the periphery of the third rotary wheel, and blowing the blank to the configuration of a blown container as the blow mold is conveyed by the third wheel along a circumferential path.

2. The method as defined in claim 1, characterized by removing the blown container from the sectional blow mold and transferring the mandrel from the third rotary wheel back to the first rotary wheel for insertion within another thermoplastic blank.

3. In the method of forming hollow containers from open-ended tubes of thermoplastic material, the steps of:
   1. conveying a plurality of tubes in succession along a common first circumferential path by a first rotary member;
   2. during the performance of step (1), forming said tubes into said parisons by (a) heating only the ends of the successive tubes to a welding temperature and then (b) forming one heated end of each tube into an article neck and the other heated end of each tube into a closed bottom;
   3. transferring the parisons in sequence from said first rotary member to a second rotary member;
   4. sucessively conveying the parisons along a common second circumferential path by said second rotary member while adjusting the temperature of each parison in its entirety to a blowing temperature;
   5. transferring the heated parisons in sequence from said second rotary member to a third rotary member; and
   6. blowing each heated parison in succession into hollow containers in blow mold cavities carried by the third rotary member.

4. A method as defined in claim 3 characterized in Step (2) by the ends of each tube being formed simultaneously.

5. A method as defined in claim 3, characterized by the ends of each tube being heated in Step (2a) to a welding temperature in excess of the blowing temperature of the thermoplastic material and by the parison being thermally conditioned in Step (4) to a temperature within the blowing temperature range of the material.

6. In a method of continuously forming blown plastic articles in succession from plastic parisons, the steps of:
   continuously rotating two adjacent co-planar horizontal rotary members about individual parallel vertical axes, the first rotary member having superimposed over its periphery a fixed arcuate, open-bottomed heating tunnel and the second rotary member carrying a plurality of blow molds adjacent its periphery;
   during the continuous rotation of said first rotary member, successively conveying plastic parisons on said first rotary member thru said heating tunnel to heat the parisons to a blowable temperature, the individual parisons being telescoped over and supported on interior, upstanding blow mandrels;
   succesively transferring the upwardly directed blow mandrels with their respective blowable parisons from said first continuously rotating rotary member to said second continuously rotating rotary member;
   during the continuous rotation of said second rotary member:
   1. supporting said transferred mandrels with their respective parisons on said second rotary member;
   2. positioning an ejector above and vertically spaced from each mandrel;
   3. closing the section of the blow molds in succession onto each of the parisons and the blow mandrels;
   4. introducing blow air through each of said upwardly directed mandrels and into the mold-enclosed parisons while said parisons are at said blowable temperature, to inflate the parisons in succession to blown articles which remain on said mandrels to project upwardly therefrom;
5. opening the blow molds in succession to expose the articles;
6. adhering the blown articles to said overhead ejectors;
7. elevating said ejector to telescopically remove the blown articles from the mandrels;
8. removing the blown articles from the ejectors; and
9. removing the mandrels in succession form said second rotary member.

7. A method as defined in claim 6, wherein Step (6) is carried out by vacuum, and Step (7) is carried out by terminating the vacuum.

* * * * *